United States Patent [19]

Stewart

[11] 3,934,089

[45] Jan. 20, 1976

[54] AUTOMATIC DISCONNECT CIRCUIT FOR SUBSCRIBER CARRIER TELEPHONE SYSTEM

[75] Inventor: James A. Stewart, Menlo Park, Calif.

[73] Assignee: GTE Automatic Electric Laboratories Incorporated, Northlake, Ill.

[22] Filed: Oct. 31, 1974

[21] Appl. No.: 519,719

[52] U.S. Cl............ 179/2.5 R; 179/16 AA; 328/184
[51] Int. Cl.²..................................... H04H 1/08
[58] Field of Search.......... 307/315, 228; 179/2.5 R, 179/16 A, 16 AA, 2.5 A; 328/184

[56] References Cited
UNITED STATES PATENTS

| | | | |
|---|---|---|---|
| 3,569,735 | 3/1971 | Lavender............................ | 328/184 |
| 3,601,538 | 8/1971 | May et al......................... | 179/2.5 R |
| 3,639,692 | 2/1972 | Krasin et al..................... | 179/2.5 R |
| 3,771,039 | 11/1973 | Stewart............................ | 179/2.5 R |
| 3,777,247 | 12/1973 | Zellmer............................ | 179/2.5 R |
| 3,780,228 | 12/1973 | Stewart............................ | 179/2.5 R |
| 3,840,703 | 10/1974 | Stewart............................ | 179/2.5 R |

*Primary Examiner*—Kathleen H. Claffy
*Assistant Examiner*—Randall P. Myers
*Attorney, Agent, or Firm*—Russell A. Cannon; Leonard R. Cool

[57] ABSTRACT

In a disconnect circuit including a pair of transistor switches that are connected in series between associated lines of a cable pair and a subscriber carrier charging circuit for selectively blocking central office battery line current to the latter during ringing of a physical subscriber handset and when the latter is off hook and is dialing, the capacitor controlling delayed turn-on of the switches is coupled thereto through a capacitive multiplier circuit. A first resistor, Zener diode, and second resistor are connected between the cable pair input sides of the switches. A control transistor is connected between the base electrodes of the switching transistors and one side of the diode. The capacitive multiplier here comprises a pair of transistors connected as a Darlington compound between the capacitor and diode for converting a variable input current to a constant low-level current for charging the capacitor, the multiplier transistors bypassing the remainder of this input current. This circuit operation or arrangement greatly increases the time for the capacitor to charge to a level that is sufficient to turn on the diode, control transistor, and switches without increasing the actual capacitance of the capacitor.

24 Claims, 3 Drawing Figures

AUTOMATIC DISCONNECT CIRCUIT FOR SUBSCRIBER CARRIER TELEPHONE SYSTEM

FIELD OF INVENTION

This invention relates to subscriber-carrier telephone communication systems in which power from a central office talking battery is used to charge a local battery in a self-contained subscriber carrier terminal that is at a location remote from the central office, and more particularly to a circuit for automatically disconnecting the local battery from the central office battery and having a long turn-on delay or reconnect time.

BACKGROUND OF INVENTION

A typical subscriber carrier telephone system generally comprises: a cable pair that is connected to central office equipment including a central office battery and A-pulsing relay; a subscriber carrier telephone handset; and one or more physical subscriber telephone handsets. The subscriber carrier handset may be connected to the cable pair through a self-contained subscriber carrier terminal that is powered by a local battery. Central office battery current on the cable pair is coupled through a subscriber carrier disconnect circuit and a subscriber carrier charging circuit to the local battery for maintaining a charge on the latter. Each physical subscriber handset is connected to the cable pair through an associated lowpass filter.

Figure 1:
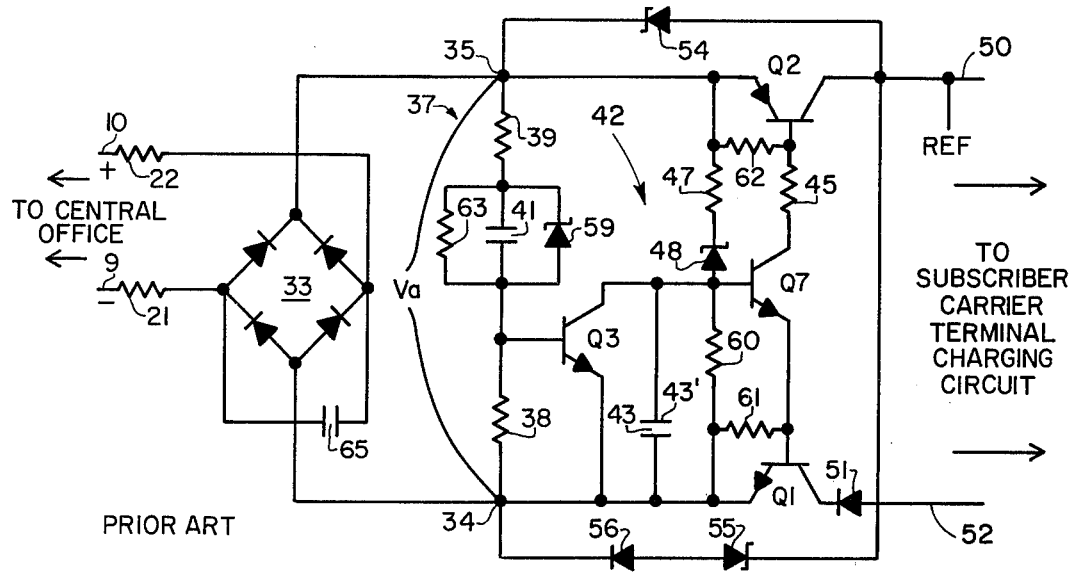
FIG. 1 is a detailed schematic diagram of a prior-art disconnect circuit for a subscriber carrier telephone system.

The prior-art disconnect circuit that is described in U.S. Pat. No. 3,840,703, issued Oct. 8, 1974, Automatic Disconnect Circuit For Reducing Dial Pulse Distortion and Noise In a Subscriber Carrier Telephone System by J. A. Stewart is generally illustrated in FIG. 1. This circuit maintains switching transistors Q1 and Q2 thereof cut off during off-hook and dialing operation of physical subscriber handsets for disconnecting the local battery charging circuit at lines 50, 52 from the cable pair 9, 10. The time delay associated here with capacitor 43 for turning switches Q1 and Q2 on when a physical handset goes on hook is approximately 150 milliseconds, which is more than twice the duration of the 58 milliseconds make interval of a dial pulse (see FIG. 3, times $t_1$ to $t_2$). It has been found that this time delay is not adequate for central offices with equipment performing called-party forced-release operations. It is desirable to delay the turn-on of Q1 and Q2 for approximately 1 minute in such applications. This delay time is approximately 400 times longer than that provided by the prior-art disconnect circuit in FIG. 1. Capacitor 43 would have an unrealistically large value of capacitance and be physically large if it were adjusted to provide such a time delay. Also, since switches Q1 and Q2 require approximately 50 microamperes of current drive for turn-on, it is impractical to provide this delay by increasing the value of one of the resistors 38, 39 or 47.

An object of this invention is the provision, in a subscriber-carrier telephone system including a circuit for charging a local subscriber-carrier battery from the cable pair and central office talking battery, of an improved disconnect circuit having a long time delay prior to reconnection of the charging circuit and the cable pair.

SUMMARY OF INVENTION

In accordance with this invention, a long time delay for turning on the series switching transistors of a disconnect circuit is obtained by coupling the timing capacitor of the circuit to a control transistor, and thus to the switches, through a capacitive multiplier which passes a limited constant current for charging the capacitor and bypasses the remainder of an input current only during turn-on operation.

DESCRIPTION OF PREFERRED EMBODIMENT

Figure 2:
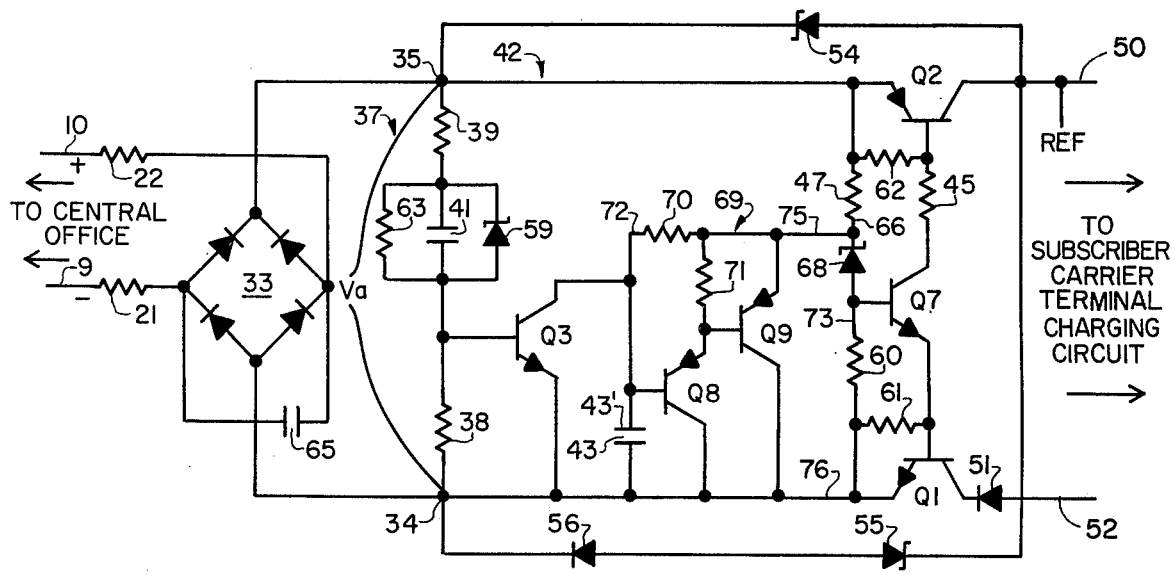
FIG. 2 is a detailed schematic diagram of a disconnect circuit embodying this invention.

The difference between the disconnect circuits in FIGS. 1 and 2 is that a capacitive multiplier circuit 69 is connected in FIG. 2 between one side 43' of capacitor 43 and the cathode of a Zener diode 68 whereas in FIG. 1 the one side 43' of capacitor 43 is connected directly to the anode of Zener diode 48. Since the structure and operation of these two disconnect circuits are so much alike, the circuit in FIG. 1 will be described here in detail. The same reference numerals are employed to designate common elements in FIGS. 1 and 2.

Referring now to FIG. 1, the prior-art disconnect circuit comprises: a diode bridge circuit 33; a first RC network 37 including resistors 38 and 39, and capacitor 41 which are connected in series across the output terminals 34 and 35 of bridge 33; a pair of transistor switches Q1 and Q2; a second RC network 42 that is also connected across the terminals 34 and 35 and between the emitters of Q1 and Q2 and which includes capacitor 43 and resistors 47 and 60; a transistor Q3 for detecting transient pulse signals and having capacitor 43 connected across the emitter-collector junction thereof; and a control transistor Q7 having a Zener diode 48 connected across the collector-base junction thereof. The switches Q1 and Q2 have opposite conduction characteristics. Transistors Q3 and Q7 are shown here as having the same conduction characteristics as does Q1. Transistor Q7 is an NPN transistor since such a device is more economical, particularly for transistors having high collector-to-emitter breakdown voltages. Alternatively, Q7 may be a PNP transistor if Q3 and capacitor 43 are associated with resistor 39 instead of resistor 38, and diode 48 is moved to remain electrically connected across the Q7 base-collector junction. Transistor Q7 and the switches Q1 and Q2 are essentially cut off over the same time intervals. The transistors in this example are silicon transistors having 0.6 volt base-emitter turn-on voltages.

Figure 3:
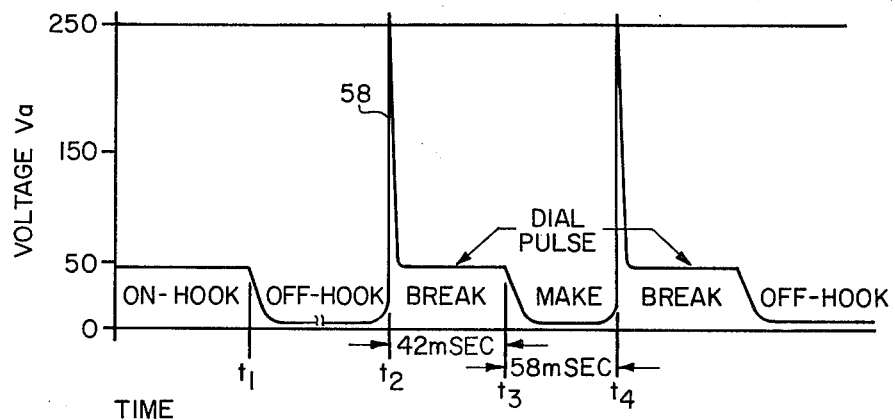
FIG. 3 is a waveform representing the applied voltage Va in the disconnect circuits in FIGS. 1 and 2 as a physical subscriber handset goes off hook and dials the number 2, the transient voltage 58 occurring on initiation of the dial pulse by the physical subscriber handset.

Diode bridge 33 is connected through resistors 21 and 22 to the cable pair 9, 10. These resistors 21 and 22 ensure line balance at voice and carrier frequencies and limit currents induced by lightening surges. The bridge 33 ensures that a local battery of a subscriber carrier terminal is connected to cable pair 9, 10 with the correct polarity regardless of the polarity of the central office talking battery voltage on lines 9, 10. The voltage produced by bridge 33 is the applied voltage Va between points 34 and 35, which is shown in FIG. 3. A curve representing the voltage on input lines 9, 10 is similar to that in FIG. 3, but is of the opposite polarity.

Transistors Q1 and Q2 are switches that isolate a charging circuit connected to output lines 50, 52 from the central office talking battery when base drive current thereto is removed. Capacitor 43 is connected across the emitter-collector junction of Q3 and across the base-emitter junctions of Q1 and Q7. This means that the charge voltage on capacitor 43 must reach 1.2 volts before Q1 and Q2 can turn on. The base electrodes of the switches Q1 and Q2 are connected in series through the control transistor Q7 emitter-collector junction and current-limiting resistor 45, as well as through the bias circuit for Q7, which comprises control diode 48 and the resistors 47 and 60 – 62. Resistor 60 has a large resistance and is employed with bias resistor 47 to connect diode 48 to points 34, 35 in order to provide a path for the leakage current of this diode 48 to flow without turning on Q7. Resistor 60 also provides a leakage discharge path for capacitor 43. Resistor 62 is employed to render the circuit less sensitive to noise spikes and to provide a path for the $i_{co}$ leakage current of Q7 without turning Q2 on. Resistor 61 serves a similar purpose and provides a symmetrical circuit. Diode 48 is a Zener diode having a breakdown voltage of 24 volts.

The Q2 collector electrode is directly connected to output terminal 50 which is preferably connected to a local power reference input line of a subscriber carrier terminal charging circuit. The collector electrode of Q1, however, is connected through junction diode 51 to the other output line 52. A Zener diode 54 is connected between the local power reference output terminal 50 and point 35. A Zener diode 55 and junction diode 56 are conected in series between the same output terminal 50 and point 34. The Zener diodes 54 and 55 are connected in the reverse directions to terminal 50 and have breakdown voltages of 100 volts to protect transistors of the disconnect circuit from voltage surges such as are caused by lightening. The diodes 51 and 56 isolate the input lines 9, 10 from output reference terminal 50 when a longitudinal voltage is induced on the former lines 9, 10 by a ringing signal on the subscriber carrier VF drop.

When the voltage V$a$ is greater than approximately 24 volts, e.g., when the physical subscriber handsets are on hook prior to time $t_1$ in FIG. 3, capacitor 41 is charged to approximately 47 volts by the voltage V$a$, Q3 and diode 59 are cut off, and diode 48 conducts to pass a charging current to capacitor 43. If the voltage on capacitor 43 exceeds approximately 1.2 volts, Q7 is caused to conduct to drive switches Q1 and Q2 into saturation to pass a charging current to output lines 50,52. The time constant of the second RC network 42 is selected to be in the order of 1.8 seconds to ensure that switches Q1 and Q2 are maintained cut off during the 100 millisecond dialing period, as is described more fully hereinafter. The breakdown voltage of diode 48 is selected to cut off this diode, and thus Q7 and switches Q1 and Q2, when the applied voltage V$a$ falls below approximately 24 volts when a physical subscriber handset goes off hook at time $t_1$ in FIG. 3. When the voltage V$a$ decreases to approximately 24 volts, diode 48 is cut off. Capacitor 43 discharges through resistor 60 and through the Q7 base-emitter junction and resistor 61 and the Q1 base-emitter junction. When the voltage on capacitor 43 drops below 1.2 volts, Q1 is rendered nonconducting to cut off Q7 and thus Q2 to disconnect output lines 50, 52 from lines 9 and 10. Capacitor 43 continues to discharge through resistor 60.

The emitter-collector junction of Q3 is connected across capacitor 43. Resistor 38 is connected across the base-emitter junction of Q3. The resistors 38 and 39 and Zener diode 59 determine the voltage V$a$ at which disconnect occurs under steady state over-voltage. Capacitor 41 acts like a short circuit during transients such as the off-hook to on-hook transient voltage 58 produced by a physical subscriber handset at the start time $t_2$ of a dial pulse break interval in FIG. 3. Transistor Q3 operates to detect initiation of the dial pulse. This voltage spike 58 forces a current through capacitor 41 and resistor 38 to bias Q3 into conduction to dump any charge on capacitor 43 and clamp the capacitor 43 voltage to approximately 0.2 volt. Although diode 48 conducts when the voltage V$a$ exceeds approximately 24 volts, Q7 remains cut off since the voltage on capacitor 43 is less than the sum of the junction voltages of Q1 and Q7. When the charge on capacitor 41 exceeds approximately 37 volts, Q3 is cut off and capacitor 43 charges toward 22 volts. If the capacitor 43 voltage exceeds 1.2 volts, then Q7, Q1, and Q2 will conduct. The time interval required to charge capacitor 43 to this level is selected to be greater than the duration of the break period between time $t_2$ and $t_3$, however, so that Q7, Q1, and Q2 remain cut off throughout dial pulse intervals produced by a physical subscriber handset. Resistor 63 has a very large resistance and is shunted across capacitor 41 to provide a leakage path to discharge the latter more rapidly when diode 48 is cut off.

In order to detect a physical handset ringing voltage on input lines 9, 10, a 47-volt Zener diode 59 is connected across capacitor 41. This diode limits the capacitor 41 voltage to this level. The diode 59 is needed since the full-wave rectified voltage V$a$ in response to such a ringing voltage on lines 9, 10 may have a rise time that is long compared to the time constant of capacitor 41 and will be followed by the latter. When the voltage V$a$ exceeds the diode 59 breakdown voltage, this diode 59 bypasses capacitor 41. The resultant voltage produced on resistor 38 biases Q3 into conduction to dump the charge voltage on capacitor 43 to cut off Q7 and Q1, and thus Q2. Since the charge time associated with capacitor 43 and conduction of Q1 and Q7 is greater than the time interval between rectified ringing voltage pulses across points 34 and 35, Q7 and the switching transistors Q1 and Q2 remain cut off throughout application of the ringing voltage to the physical subscriber handset. Capacitor 65 is a lowpass filter that aids in blocking the high frequency noise generated in a charging circuit from the input lines 9, 10 so that it will not affect the receiver in the carrier channel.

The circuit of FIG. 1 is designed to connect output lines 50, 52 to cable pair 9, 10 when a physical subscriber handset is on hook for a long time period that is greater than the 100 millisecond dial pulse interval (this enables a charging circuit on output lines 50, 52 to charge a subscriber carrier local battery from a central office talking battery over input lines 9, 10); to disconnect lines 50, 52 from lines 9, 10 when the magnitude of the line voltage (i) is less than approximately 25 volts, which corresponds to a physical subscriber handset being off hook (this prevents the charging circuit loading input lines 9, 10 and increasing loss to VF signals in the physical channel), (ii) is greater than approximately 60 volts which corresponds to a physical handset ringing voltage (this prevents the physical channel ringing voltage on input lines 9, 10 coupling noise through the charging circuit and into a subscriber carrier handset), and (iii) is an increasing transient voltage of greater than approximately 10 volts such as is produced during the off-hook to on-hook transition at time $t_1$ when a physical subscriber handset is dialing (this reduces dial pulse distortion); and to provide discontinuous DC paths in the disconnect circuit between input lines 9, 10 and the local power reference output terminal 50 (this prevents the VF ringing signal for the subscriber carrier subset producing a noise signal in a physical subscriber handset when the latter is off hook).

The detailed operation of the disconnect circuit in FIG. 1 will now be described in relation to the waveform in FIG. 3 which represents the voltage $Va$ under various conditions.

When the physical subscriber handsets are on hook prior to time $t_1$, capacitor 41 is charged to 47 volts by the voltage $Va$, Q3 and diode 59 are cut off, diode 48 is conducting, capacitor 43 is charged to approximately 1.2 volts which is the sum of the base-emitter potentials of Q1 and Q7, Q7 is conducting, and switches Q1 and Q2 are saturated to pass a charging current to output lines 50, 52.

When a physical subscriber handset goes off hook at time $t_1$ in order to dial the number 2, for example, the magnitude of the line voltage drops to something less than 25 volts, e.g., 5 volts. The 47 volts stored on capacitor 41 reverse biases and cuts off the diodes of bridge 33, and this capacitor 41 rapidly discharges through Q1 and Q2 and network 37. Switches Q1 and Q2 continue to conduct in saturation since the voltage developed across resistor 38 is not sufficient to bias Q3 into conduction to discharge capacitor 43. When the voltage on capacitor 41 decreases to approximately 25 volts, diode 48 is cut off. Transistors Q1, Q2, and Q7 continue to conduct, however, since the voltage on capacitor 43 is ≥ 1.2 volts. Capacitor 43 discharges through resistor 60 and through the Q7 base-emitter junction. When the voltage on capacitor 43 drops below 1.2 volts, Q1 is rendered nonconducting to cut off Q7 and thus Q2 to disconnect output lines 50, 52 from input lines 9 and 10. Capacitors 41 and 43 continue to discharge to new equilibrium voltages through associated resistors 63 and 60.

Release of the dial in the physical subscriber handset at time $t_2$ opens the dial contacts thereof and causes the transient voltage 58 to appear across points 34 and 35. In practice, the transient voltage 58 may have a magnitude of hundreds of volts and a duration of approximately 5 milliseconds. Since capacitor 41 cannot charge instantaneously, the voltage spike 58 forces a current through this capacitor 41 and resistors 38 and 39. The voltage developed across resistor 38 drives Q3 into conduction to dump any charge on capacitor 43 and thus to clamp the voltage thereon to approximately 0.2 volt, which is the Q3 emitter-collector potential. When the voltage $Va$ exceeds approximately 24 volts, diode 48 breaks down. Since the voltage across capacitor 43 is less than the 1.2 volts base-emitter turn-on potentials of Q1 and Q7, however, these transistors are maintained cut off. Capacitor 41 charges throughout the transient voltage 58 to maintain Q3 conducting (and thus Q1, Q2, and Q7 cut off) until the voltage developed across this capacitor 41 exceeds approximately 37 volts, in approximately 10 milliseconds. At this time, the current in resistor 38 is not sufficient to maintain Q3 conducting, and it is biased into cut-off.

With Q3 cut off (as are Q1, Q2, and Q7) and a voltage $Va$ of approximately 47 volts, capacitor 43 charges through diode 48 from 0.2 volt toward 22 volts. When the voltage on capacitor 43 reaches 1.2 volts, transistors Q1, Q2, and Q7 will conduct. Since the time constant of capacitor 43 and resistor 47 is selected to be large (approximately 1.8 seconds), however, approximately 150 milliseconds are required for capacitor 43 to charge sufficiently to turn Q7 on to drive Q1 and Q2 into saturation. This time interval is greater than the duration of the 42 millisecond break portion of the dial pulse period. Thus, control transistor Q7 and the switching transistors Q1 and Q2 are maintained cut off throughout the dial pulse break period between times $t_2$ and $t_3$. This operation reduces dial pulse distortion to enable the A-pulsing relay contacts in the central office to rapidly open in response to the physical subscriber dial pulse.

When the magnitude of the input line 9, 10 voltage again decreases to approximately 5 volts during the 58 millisecond make period of the dial pulse (see FIG. 3, times $t_3 - t_4$), the voltage $Va$ is still approximately 47 volts due to the charge on capacitor 41 which cuts off the diodes of bridge 33. Capacitor 41 discharges through resistor 47, diode 48 and capacitor 43 until the capacitor 41 voltage is less than approximately 24 volts. At this time, diode 48 is cut off. The time constant associated with the discharge path of capacitor 41 is approximately 12 milliseconds, which is not long enough for the capacitor 43 to have charged sufficiently to bias Q7 into conduction. The transistor switches Q1 and Q2 are therefore maintained cut off throughout the dial pulse interval (time $t_2$ to $t_4$) initiated by a physical subscriber handset and while that handset is off-hook. Capacitor 41 continues to discharge to a new equilibrium voltage through resistor 63 while all of the transistors Q1, Q2, Q3 and Q7 are cut off during the remainder of the make period of a dial pulse interval. This operation is repeated during the next dial pulse interval.

When a ringing signal is applied to a physical subscriber handset, the voltage on input lines 9 and 10 is a low frequency (e.g., 20 Hz) signal superimposed in the 48 volt talking battery voltage. This 100 volt low-frequency ringing voltage causes diode 59 to conduct to bypass capcitor 41. The resultant current through resistor 38 causes Q3 to conduct to dump the charge on capacitor 43 to cut off Q1, Q2, and Q7. This operation disconnects output lines 50, 52 from cable pair 9, 10 during this ringing pulse and prevents a noise signal being coupled to a subscriber carrier handset.

If the VF drops for both a subscriber carrier and a physical subscriber handset are in the same cable sheath, the carrier channel VF ringing voltage may be capacitively coupled as a longitudinal signal onto the physical VF drop and back through input lines 9, 10 to the input of the disconnect circuit. If a continuous path exists through the disconnect circuit to the power reference terminal 50, a noise signal is produced in a physical subscriber handset when the latter is off hook. The diodes 51 and 56 are employed to prevent conduction paths through either diode 48 or the base-collector junction diode of Q7, and then either through the Q1 base-collector junction diode and the charging circuit or through the Q1 base-emitter junction diode and Zener diode 55 to the local power reference on output terminal 50.

In accordance with the preferred embodiment of this invention in FIG. 2, a 12-volt Zener diode 68 is employed in place of the 24-volt Zener diode 48 and, capacitor 43 is electrically connected to the cathode of diode 68 (which is spaced away from the Q7 base electrode) through a capacitive multiplier circuit 69. Thus, the capacitor 43 and resistor 70 of circuit 69 are effectively connected across the series combination of diode 68, the Q7 base-emitter junction, and the Q1 base-emitter junction. It is readily apparent therefore that in this disconnect circuit the voltage across capacitor 43 and resistor 70 must reach approximately 13.2 volts for Q7 to conduct to turn on switches Q1 and Q2 and thereby connect a central-office battery charging current to output lines 50, 52.

The capacitive multiplier circuit 69 comprises a pair of transistors Q8 and Q9 that are connected as a Darlington compound and a pair of resistors 70 and 71. The collector electrodes of Q8 and Q9 are both connected to the Q1 emitter electrode. The Q9 emitter electrode is connected to the cathode of diode 68 so that the Q9 emitter-collector junction is across this diode 68 and resistor 60. The Q8 emitter and base electrodes are connected to the Q9 base electrode and to the side 43' of capacitor 43, respectively. Resistor 70 is connected across the series combination of base-emitter junctions of Q8 and Q9 to provide a constant charging current to capacitor 43. Resistor 71 is connected across the Q9 base-emitter junction to ensure that Q8 and Q9 are cut off during equilibrium conditions when capacitor 43 is charged to a level sufficient to drive diode 68 and transistors Q7, Q1, and Q2 into conduction.

A basic consideration in this disconnect circuit is that resistor 47 pass a sufficient current to turn Q7 on and drive Q1 and Q2 into saturation during normal operation, with the physical subscriber handsets on hook. A low level of current for charging capacitor 43, however, will increase the time interval or delay time for the charge voltage on this capacitor 43 to increase to a threshold level that is sufficient to turn on transistors Q7, Q1, and Q2. The circuit in FIG. 2 satisfies both of these conflicting considerations. A Zener diode 68 that is connected in series with the base-emitter junctions of Q1 and Q7 increases this threshold level and thus the delay time for the voltage across resistor 70 and the charge voltage on capacitor 43 to exceed the prescribed threshold level. Since diode 68 is a 12-volt Zener in this example, the prescribed threshold level here is approximately 13.2 volts.

Consider the operation of this circuit in FIG. 2 when a physical subscriber handset is off hook for a considerable time interval such that: the voltage $Va$ is approximately 5 volts; capacitor 41 is discharged through resistor 63; capacitor 43 is discharged through resistors 70, 47, 39, 63, and 38 to approximately 5 volts; diodes 59 and 68 are nonconducting; and all of the transistors are cut off. When a physical handset goes no hook, the transient voltage 58 across points 34 and 35 forces current through resistor 38 which biases Q3 into conduction to dump any charge on capacitor 43 and clamp the voltage across it to approximately 0.2 volt. The voltage 58 also appears across resistor 47, resistor 70, and capacitor 43 (i.e., the Q3 collector-emitter junction).

The current on line 72 rapidly increases to produce a voltage drop of approximately 1.2 volts across resistor 70 which causes transistors Q8 and Q9 to conduct. Since the voltage across this resistor 70 cannot exceed 1.2 volts, this circuit arrangement then provides a constant low-level current on line 72 for charging capacitor 43. During conduction of Q3, however, this transistor Q3 bypasses the charging current on line 72 around the capacitor 43. When Q3 is cut off, this constant low-level current on line 72 charges capacitor 43. Since diode 68 and transistors Q7 and Q1 are cut off, the remainder of the drive current on line 66 is bypassed by Q8 and Q9. As the charge voltage on capacitor 43 increases, the voltage across resistor 47 and thus the drive current on line 66, decreases. Thus, a varying drive current is produced on line 66 and applied to circuit 69 during charging of capacitor 43. A constant charging current is provided on line 72, however, by the operation of resistor 70 and transistors Q8 and Q9, the amount of current passed by these transistors being variable.

When the sum voltage across capacitor 43 and resistor 70 increases to approximately 12 volts, diode 68 conducts to bypass some of the current previously passed by Q8 and Q9. When this voltage on capacitor 43 and resistor 70 increases to approximately 13.2 volts, Q7 conducts to pass more of the current on line 66 to drive transistors Q1 and Q2 into saturation. When an equilibrium condition is established with Q7, Q1, and Q2 conducting, only a very small trickle current is passed by resistor 70 to maintain the sum of the resistor 70 voltage and the charge voltage on capacitor 43 at approximately 13.2 volts. Since the resultant voltage developed across resistor 70 by this trickle current is less than 1.2 volts, transistors Q8 and Q9 are cut off. Resistor 71 is employed to ensure cut-off of these transistors Q8 and Q9 when such a small current is passed by resistor 70.

In the disconnect circuit in FIG. 2, the current I on line 72, the capacitance C of capacitor 43, the change $\Delta V$ in voltage on capacitor 43, and the time delay $\Delta t$ for charging capacitor 43 to a threshold level for turning on Q7 are approximately related by the following equations:

$$I = C \ (dV/dt) \tag{1}$$

and $$\Delta T = C \ (\Delta V/I) \tag{2}$$

In a disconnect circuit embodying this invention that was successfully built and tested, capacitor 43 had a capacitance of 22 microfarads, the difference voltage $\Delta V$ on capacitor 43 was 13 volts, the resistance of resistor 70 was 348 kohms providing a current I = 3.45 microamps on line 72 such that the delay time $\Delta t$ was approximately 83 seconds. Since the Q8 base current adds approximately 0.1 to 0.3 microamps of charging current to capacitor 43, the overall time delay $\Delta t$ of this circuit was approximately 70 seconds. Stated differently, circuit 69 effectively increases the capacitance of capacitor 43 by the ratio of the sum of the currents bypassed by Q8 and Q9, divided by the current through resistor 70 on line 72.

The operation of this disconnect circuit in FIG. 2 will now be considered in relation to the voltage $Va$ in FIG. 3. When the physical subscriber handsets are on hook prior to time $t_1$, capacitor 41 is charged to approximately 47 volts, Q3 and diode 59 are cut off, the sum of the voltages on resistor 70 and capacitor 43 is approximately 13.2 volts, transistors Q8 and Q9 are cut off, and diode 68 and transistor Q7 are conducting to hold Q1 and Q2 in saturation to pass a central-office battery charging current to the output lines 50, 52. When a physical subscriber handset goes off hook at time $t_1$ to dial the number 2, for example, the magnitude of the line voltage drops to approximately 5 volts, which cuts off diode bridge 33. Capacitor 41 rapidly discharges through Q1 and Q2 and network 37. When the voltage on capacitor 41 decreases to approximately 13.2 volts, capacitor 43 then discharges through diode 68 and resistor 60, and through the Q7 and Q1 base-emitter junction diodes. When the voltage on capacitor 43 and resistor 70 is less than 13.2 volts threshold level such that the current on line 73 is insufficient to maintain a voltage drop of 1.2 volts across resistor 60, then Q1, Q2, and Q7 cut off. Capacitor 43 continues to discharge through diode 68 and resistor 60 until the voltage on capacitor 43 and resistor 70 drops below 12 volts to cut off diode 68. This capacitor 43 continues to discharge through resistors 70, 47, 39, 63, and 38. Capacitor 41 also discharges during this time interval through resistor 63.

Upon release of the dial in the physical subscriber handset at time $t_2$, the transient voltage 58 across points 34 and 35 forces current to flow through capacitor 41 and resistor 38 to bias Q3 into conduction to dump any charge on capacitor 43 and clamp the capacitor 43 voltage to approximately 0.2 volt. This voltage pulse 58 is also applied across resistor 47 and transistors Q8 and Q9 to cause the latter to conduct throughout the 42 millisecond break interval of the dial pulse. The current on line 72 is bypassed by Q3 during conduction of the latter so that the capacitor 43 voltage is maintained at 0.2 volt. When the current through resistor 38 decreases sufficiently, Q3 is cut off and the constant charging current on line 72 is applied to capacitor 43. If the sum of the voltages on capacitor 43 and resistor 70 exceeds 12 volts or 13.2 volts, diode 68 and Q7, respectively, will conduct. Since the delay time required to charge capacitor 43 to such levels is greater than the duration of the 42 millisecond break interval between times $t_2$ and $t_3$, however, the diode 68 and transistors Q7, Q1, and Q2 remain cut off throughout the dial pulse interval between times $t_2$ and $t_4$ that is produced by a physical subscriber handset.

If a ringing signal is applied on lines 9 and 10 to a physical subscriber handset when the latter is on hook prior to time $t_1$, the approximately 100 volts ringing voltage breaks down Zener diode 59 to bypass capacitor 41. The resultant voltage on resistor 38 biases Q3 into conduction to dump the charge voltage on capacitor 43 to cut off diode 68 and transistors Q7, Q1, and Q2. Although resistors Q8 and Q9 are conducting, Q3 bypasses the current on line 72 around capacitor 43. Since the charge time associated with capacitor 43 and conduction of diode 68 and the transistors Q1, Q2, and Q7 is greater than the time interval between rectified ringing voltage pulses across points 34 and 35, diode 68, control transistor Q7, and the switching transistors Q1 and Q2 remain cut off throughout application of the ringing voltage to a physical subscriber handset.

Although circuitry for charging timing capacitor 43 is described in a preferred embodiment in relation to a subscriber carrier disconnect circuit, the source voltage on lines 9 and 10, resistor 47, Darlington compound 69, resistor 70, and capacitor 43 may also be employed to produce a linear ramp voltage across lines 75 and 76. The invention herein is therefore defined by the following claims rather than by the detailed disclosure of a preferred embodiment thereof.

What is claimed is:

1. In a disconnect circuit for a remote terminal in a subscriber carrier telephone system wherein the circuit has a pair of input terminals electrically connected to a central office battery voltage; a pair of output terminals; a first transistor which is a transistor switch having emitter and collector electrodes electrically connected to one input and one output terminal, respectively; first means having a pair of terminals electrically connected to associated other input and other output terminals for electrically connecting the latter together and having a third terminal; a second transistor which is a control transistor having a collector-emitter junction electrically connected between the first transistor base electrode and the third terminal of the first means; a timing capacitor having one terminal electrically connected to the one input terminal and having an other terminal; second means normally directly electrically connecting the other terminal of the timing capacitor to the second transistor base electrode, the timing capacitor being operative for storing a voltage controlling turn-on of the first and second transistors; third means for resistively coupling drive current from the other input terminal for application to the base electrode of the second transistor for selectively enabling the latter transistor and the first transistor to conduct and for charging the timing capacitor; and fourth means responsive to a prescribed voltage condition produced across the input terminals for selectively discharging the timing capacitor; the improvement wherein said second means comprises: fifth means for selectively bypassing away from the second transistor base electrode a constant current portion of the drive current from the third means and selectively passing it to the capacitor for charging the latter, and for bypassing away from the second transistor and the capacitor a variable portion of the drive current from the third means during charging of the capacitor to maintain a constant charge current to the capacitor during charging of the latter; at least part of the current from the third means that is passed by said fifth means during charging of the capacitor being passed by the second transistor when the charge voltage on the capacitor is sufficient to cause the voltage between the second transistor base electrode and the first transistor emitter electrode to exceed a threshold voltage related to conduction of the second transistor.

2. The improved circuit according to claim 1 wherein said fifth means comprises third and fourth transistors having collector electrodes electrically connected to the one input terminal and having emitter electrodes electrically connected to the second transistor base electrod, the third transistor base electrode being electrically connected to the fourth transistor emitter electrode, and the fourth transistor base electrode being electrically connected to the other terminal of the capacitor.

3. The improved circuit according to calim 2 wherein said fifth means comprises a first resistor being electrically connected across the series combination of the base-emitter junctions of the third and fourth transistors.

4. The improved circuit according to claim 3 including a Zener diode in the electrical connection of the second transistor base electrode to the third means and to the first resistor for increasing the threshold voltage and thus the capacitor charge voltage and the charge time required to turn on the second transistor.

5. The circuit according to claim 4 including a second resistor electrically connected between said second transistor base electrode and said first transistor emitter electrode.

6. In combination with a subscriber carrier disconnect circuit having a pair of input terminals for connection to a central office battery voltage; a pair of output terminals for connection to a local subscriber carrier battery charging circuit; a first capacitor and first resistor electrically connected in series across the input terminals; a first transistor which is a control transistor having a base-emitter junction electrically connected across the first resistor and having a collector electrode; a second transistor which is a transistor switch having emitter and collector electrodes electrically connected to one input and one output terminal, respectively; first means having first and second terminals electrically connected to associated other input and other output terminals for selectively electrically connecting the latter together and having a third terminal; a third transistor which is a control transistor having a collector-emitter junction electrically connected between the second transistor base electrode and the third terminal of the first means; a second capacitor, which is a timing capacitor, having first and second terminals electrically connected to the first transistor emitter and collector electrodes, respectively, and being operative for storing a voltage that controls turn-on of the second and third transistors, the second terminal of the second capacitor being normally directly electrically connected to the third transistor base electrode; and second means for resistively coupling drive current from the other input terminal for application to the base electrode of the third transistor for selectively enabling the second and third transistors to conduct: capacitive multiplier means in the electrical connection of the second terminal of the second capacitor to the third transistor base electrode for coupling the second capacitor to the second means for effectively increasing the capacitance of the second capacitor and the time for the latter to accumulate a prescribed charge voltage that is sufficient to cause the voltage between the third transistor base electrode and the second transistor emitter electrode to be greater than the sum of the base-emitter junction voltages of the second and third transistors for causing these transistors to conduct.

7. The combination according to claim 6 wherein said capacitive multiplier means comprises:
a Darlington circuit electrically connected across the second capacitor and to the second means; and
a second resistor electrically connected in series with the second capacitor and the second means and being electrically connected to said Darlington circuit for selectively providing a constant charging current portion of drive current from the second means to the second capacitor for charging the latter to the prescribed charge voltage during non-conduction of the first, second, and third transistors, another variable portion of the drive current being simultaneously bypassed from the second and third transistors by the operation of the Darlington circuit.

8. The combination according to claim 7 wherein said Darlington circuit comprises fourth and fifth transistors having collector electrodes electrically connected to the one input terminal and having emitter electrodes electrically connected to the third transistor base electrode, the fourth transistor base electrode being electrically connected to the fifth transistor emitter electrode, and the fifth transistor base electrode being electrically connected to the first transistor collector electrode and the second terminal of the second capacitor.

9. The combination according to claim 8 wherein said second resistor is electrically connected across the series combination of the base-emitter junctions of the fourth and fifth transistors.

10. The combination according to claim 9 including a Zener diode in the electrical connection of the third transistor base electrode to the second means and the second resistor for increasing the second capacitor charge voltage and the time that is required to turn on the third transistor.

11. The combination according to claim 10 including a third resistor being electrically connected between the fifth transistor emitter electrode and the terminal of said second resistor that is electrically connected to the fourth transistor emitter electrode.

12. The circuit according to claim 5 including a third resistor electrically connected between the emitter electrodes of said third and fourth transistors.

13. Apparatus producing a ramp voltage that is linear as a function of time in response to an input voltage that is greater than a prescribed value, comprising:
an input port having first and second input terminals for receiving the input voltage;
a capacitor having a first terminal electrically connected to the first terminal of said input port and having a second terminal, and
first means coupled across said input port and being operative when the input voltage is greater than the prescribed value for coupling a signal current therefrom having a value that may vary as a function of time, said first means also being operative for passing to the second terminal of said capacitor a constant current portion of the signal current for linearly charging said capacitor at a linear rate as a function of time and for bypassing around said capacitor a variable remainder portion of the signal current as a function of time,
at least one of said input terminals being resistively electrically connected to said first means.

14. Apparatus according to claim 13 wherein said first means comprises first and second transistors having collector and emitter electrodes electrically connected to the first and second input terminals, respectively, the first transistor base electrode being electrically connected to the second transistor emitter electrode, and the second transistor base electrode being electrically connected to the second terminal of said capacitor.

15. Apparatus according to claim 14 wherein said first means comprises a resistor that is electrically connected across the series combination of the base-emitter junction of said transistors.

16. Apparatus according to claim 13 including second means associated with said capacitor for selectively discharging said capacitor.

17. Apparatus according to claim 16 wherein the final value of the linear ramp voltage on said capacitor may approach the input voltage.

18. Apparatus for automatically disconnecting a local subscriber carrier battery charging circuit that is connected, in a subscriber carrier telephone system including a physical subscriber subset and a carrier subscriber subset, through a cable pair to a central office power source from the latter during off-hook and dial conditions produced on the cable pair by the physical subscriber subset, said apparatus comprising
first and second input terminals for connection to associated lines of the cable pair;
first and second output terminals for connection to the charging circuit;
a first transistor which is a switching transistor having an emitter electrode electrically connected to said first input terminal, having a collector electrode electrically connected to said first output terminal, and having a base electrode; said first transistor being conducting to connect and being cut off to disconnect the charging circuit and power source;
first means having first and second terminals electrically connected to said second input and second output terminals, respectively, for electrically connecting the latter together;
a first capacitor having a first terminal electrically connected to said first input terminal and having a second terminal;
a first resistor having a first terminal electrically connected to said second input terminal and having a second terminal;
second means for selectively coupling drive current from the second terminal of said first resistor for application to the first transistor base electrode for enabling the latter to conduct, said second means and the first transistor base-emitter junction voltage determining a threshold voltage below which said first transistor is nonconducting;
third means operative for electrically connecting the second terminal of said first capacitor to the second terminal of said first resistor for enabling charging said first capacitor during on-hook and break pulse conditions produced on the cable pair by the physical subscriber subset; said third means being operative for selectively bypassing away from said second means a constant current portion of the drive current from said first resistor and selectively passing it to said first capacitor for charging the latter during the on-hook and break pulse conditions produced on the cable pair by the physical subscriber subset; and for selectively bypassing around said second means and said first capacitor a variable portion of the drive current from said first resistor during charging of said first capacitor to maintain a constant charge current to the latter during charging thereof;
said second means coupling at least part of the bypassed drive current away from said third means and passing it to said first transistor for causing the latter to conduct when the charge voltage on said first capacitor is sufficient to cause the voltage between the second terminal of said first resistor and said first transistor emitter electrode to be greater than the threshold voltage for causing said first transistor to pass a charging current from the central office power source; the time interval for the charge voltage on said first capacitor to charge to a level for turning on said first transistor being longer than the duration of the make and break intervals of a dial pulse; and
fourth means responsive to a transient voltage condition produced across said input terminals by the physical subscriber subset on the leading edge of a dial pulse break interval for selectively discharging said first capacitor.

19. Apparatus according to claim 18 wherein said third means comprises a second resistor being electrically connected in series with said first capacitor and first resistor, said third means selectively providing a constant voltage across said second resistor during charging of said first capacitor for providing a constant charging current thereto.

20. Apparatus according to claim 18 wherein said third means comprises a second resistor electrically connected between the second terminals of said first capacitor and first resistor; and second and third transistors having collector electrodes electrically connected to said first input terminal and having emitter electrodes electrically connected to the second terminal of said first resistor, the second transistor base electrode being electrically connected to the third transistor emitter electrode, and the third transistor base electrode being electrically connected to the second terminal of said first capacitor.

21. Apparatus according to claim 20 wherein said first means has a third terminal and wherein said second means comprises
a fourth transistor having emitter and collector electrodes electrically connected in series between said first transistor base electrode and said third terminal of said first means, and having a base electrode; and
a Zener diode electrically connected between the fourth transistor base electrode and the second terminal of said first resistor for causing the value of the threshold voltage to be greater than the sum of the base-emitter junction voltages of said first and fourth transistors.

22. Apparatus according to claim 21 wherein said fourth means comprises a second capacitor and third resistor electrically connected in series between said input terminals, and a fifth transistor having a base-emitter junction electrically connected across said third resistor and having an emitter-collector junction electrically connected across said first capacitor.

23. Apparatus according to claim 22 including a second Zener diode and a fourth resistor that are each electrically connected in parallel with said second capacitor.

24. Apparatus according to claim 23 wherein said third means includes a fifth resistor in the electrical connection of the third transistor emitter electrode to the second terminal of said first resistor.

* * * * *